US012638868B1

(12) United States Patent
Paganini De Mio et al.

(10) Patent No.: US 12,638,868 B1
(45) Date of Patent: May 26, 2026

(54) MODULAR THERMAL MONITORING SYSTEM

(71) Applicant: Tractian Technologies Inc, Atlanta, GA (US)

(72) Inventors: Pedro Paganini De Mio, São Paulo (BR); João Cadorin Falleiros, São Paulo (BR); Flávio Roberto Bizerra Junior, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/361,465

(22) Filed: Oct. 17, 2025

(51) Int. Cl.
G05D 23/19 (2006.01)
H04L 45/00 (2022.01)

(52) U.S. Cl.
CPC ....... *G05D 23/1932* (2013.01); *G05D 23/193* (2013.01); *H04L 45/22* (2013.01); *G01K 2213/00* (2013.01); *G05D 23/19* (2013.01)

(58) Field of Classification Search
CPC ... F23N 3/00; F24F 11/00; F24F 11/30; F24F 11/46; F24F 11/62; F24F 11/67; F24F 11/88; F24F 11/50; F24F 11/52; F24F 11/523; F24F 11/54; H02J 1/00; H02V 1/00; G05D 23/00; G05D 23/19; G05D 23/1927; G05D 23/193; G05D 23/1932
See application file for complete search history.

(56) References Cited

U.S. PATENT DOCUMENTS

| 5,924,486 | A | * | 7/1999 | Ehlers | F24F 11/62 |
| | | | | | 165/238 |
| 12,166,824 | B2 | * | 12/2024 | Skaaksrud | G01N 33/004 |
| 2013/0268124 | A1 | * | 10/2013 | Matsuoka | F24F 11/88 |
| | | | | | 700/276 |

* cited by examiner

*Primary Examiner* — Van T Trieu
(74) *Attorney, Agent, or Firm* — Cognition IP, P.C.; Edward Steakley; Schiller Hill

(57) ABSTRACT

Systems and methods for thermal monitoring of electrical panels and cabinets. The system comprises sensor nodes and rigid links. The nodes may be modular and configured to connect to one another through the rigid links. The rigid links may be of a predefined length and the physical layout of the nodes may be determined by mapping each node to a coordinate location based on the length of the rigid link and the position and orientation of the starting and ending ports on the nodes being connected. This allows for the generation of coverage maps of the sensors and layouts to be generated without prior knowledge of the node placement.

20 Claims, 13 Drawing Sheets

400

Attach, to an inside surface of a door of an electric panel, a master node and one or more slave nodes. — 401

Connect one or more rigid links to the master node and each of the one or more slave nodes, wherein each rigid link comprises a first connector end and a second connector end. — 402

Receive, by a controller device, one or more parameters for each rigid link, wherein the one or more parameters comprise length of the rigid link and information corresponding to orientation and position of the connections made by the first connector end and second connector end of the rigid link. — 403

Determine a position for each slave node relative to a position of the master node. — 404

Generate a physical layout map of the one or more slave nodes and the master node. — 405

Map the physical layout map to a panel layout. — 406

Receive, from the master node, aggregated sensor data. — 407

Map the received aggregated sensor data to the physical layout map. — 408

Analyze, by an analysis module, the received aggregated sensor data. — 409

Overlay, onto the physical layout map, results of said analysis. — 410

100

Controller
Device
105

Network Module
201

Datastore Module
202

Node Controller Module
203

Node Communication
204

Power Module
205

400

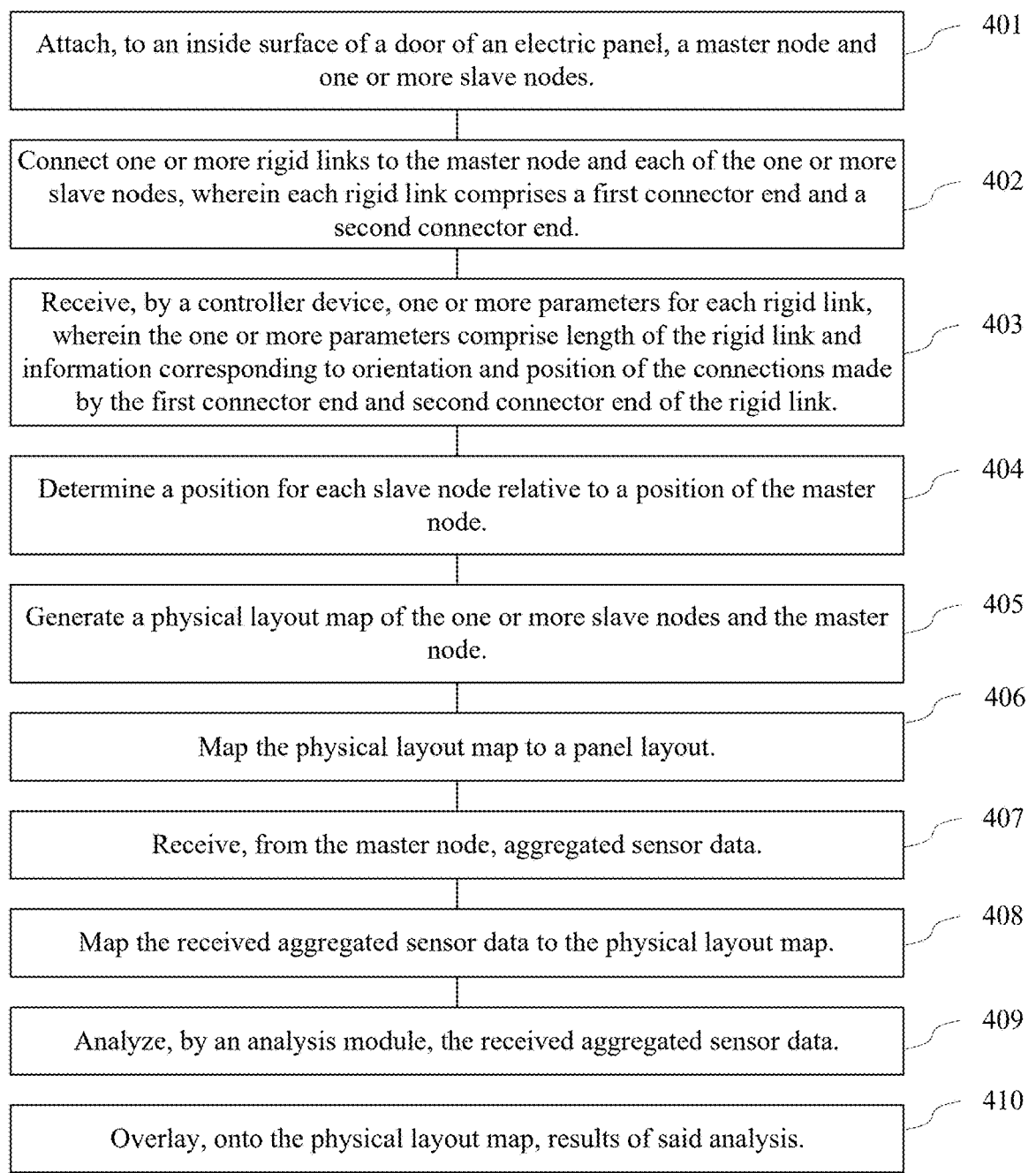

Attach, to an inside surface of a door of an electric panel, a master node and one or more slave nodes.     401

Connect one or more rigid links to the master node and each of the one or more slave nodes, wherein each rigid link comprises a first connector end and a second connector end.     402

Receive, by a controller device, one or more parameters for each rigid link, wherein the one or more parameters comprise length of the rigid link and information corresponding to orientation and position of the connections made by the first connector end and second connector end of the rigid link.     403

Determine a position for each slave node relative to a position of the master node.     404

Generate a physical layout map of the one or more slave nodes and the master node.     405

Map the physical layout map to a panel layout.     406

Receive, from the master node, aggregated sensor data.     407

Map the received aggregated sensor data to the physical layout map.     408

Analyze, by an analysis module, the received aggregated sensor data.     409

Overlay, onto the physical layout map, results of said analysis.     410

MODULAR THERMAL MONITORING SYSTEM

FIELD

The present invention relates generally to systems, tools and methods to thermally monitor electrical panels and cabinets.

BACKGROUND

Early fault detection in electrical panels and cabinets is crucial in maintaining operational continuity and reliability of an industrial system. However, monitoring such panels and cabinets is commonly overlooked or neglected as failures tend to progress slowly and may escalate over a period of days, months or even years. The health of an electrical panel may degrade from environmental factors, electrical and mechanical stress, and insufficient maintenance over time.

In some environments, equipment directly or indirectly connected to a slowly failing electrical panel or cabinet may be damaged over time due to power surges, voltage fluctuations, overheating, and other electrical problems. In some instances, electrical panels and cabinets that are starting to degrade may generate unintended electromagnetic interference that can harm or interfere in the operation of nearby equipment.

Current monitoring is performed through manual checks of the panels and their components, including visual checks and the use of handheld thermal systems. By the time an issue has been identified, additional damage to the system may have been building up for years, increasing the number of systems in need of repair and the overall cost of the repairs. Regular health checks by a technician are not always feasible and are cost prohibitive. A system is needed to identify faults in a cost-effective manner before they begin to affect the health and performance of other systems. The present invention provides for a low cost, easy to install and intelligent modular monitoring system that tracks the health of an electrical panel or cabinet, identifies anomalies in the operation of the panel/cabinet, schedules maintenance tasks, detects early signs of faults, provides notification of failures, generates operational reports based on analysis of sensor monitoring the panel/cabinet and generates visual representations of the analysis.

SUMMARY

The systems and methods described herein provide for the monitoring of electrical panels and/or cabinets. In some embodiments, the system may comprise one or more links, a master node and one or more slave nodes.

Each of the one or more links may comprise a first connector end and a second connector end. The master node may comprise a master node controller module, a master node communication module, a master sensor module, wherein the master sensor module comprises a temperature sensor and one or more master connection port modules.

In some embodiments, each of the one or more slave nodes may comprise a slave node communication module, a slave sensor module, wherein the slave sensor module comprises a temperature sensor and one or more slave connection port modules.

In some embodiments, the master node may be configured to connect to a first level group of nodes, wherein the first level group of nodes comprises one or more of the one or more slave nodes.

In some embodiments, each of the first level group may be connected to one or more secondary children nodes, wherein the secondary children nodes may comprise one or more slave nodes.

In some embodiments, a controller device, in communication with a server over a network connection, may be configured to determine a position for each slave node relative to a position of the master node. The controller device may further be configured to generate a physical layout map of the one or more slave nodes and the master node and map the physical layout map to a panel layout.

In some embodiments, the controller device may receive, from the master node, aggregated sensor data, wherein the aggregated sensor data may comprise sensor data from each of the one or more slave nodes and sensor data from the master node. The aggregated sensor data may then be mapped to the physical layout map. In some embodiments, an analysis module may then analyze the received aggregated sensor data. In some embodiments, the results of the analysis may then be overlaid onto the physical layout map.

In some embodiments, one or more of the links may be rigid links.

In some embodiments, each node of the first level group may be connected through a slave connection port module to a master connection port module of the master node by a rigid link. In some embodiments, the first connector end of the rigid link may be attached to the master connection port module and the second connector end of the rigid link may be attached to the slave connection port module.

In some embodiments, each secondary child node may be connected through a slave connection port module on the secondary child node to a slave connection port module of the first level group node by a rigid link. The first connector end of the rigid link may be attached to the slave connection port module of the first level group node and the second connector end of the rigid link may be attached to the slave connection port module of the secondary child node.

In some embodiments, the controller device may further be configured to receive, from the master node, one or more parameters for each rigid link, wherein the one or more parameters may comprise length of the rigid link and information corresponding to orientation and position of the connections made by the first connector end and second connector end of the rigid link.

In some embodiments, determining the position of each slave node may comprise identifying a target slave node, identifying one or more rigid links between the target slave node and the master node and calculating a coordinate position of the target slave node based on the one or more parameters of each identified rigid link.

In some embodiments, the position of the target slave node may be updated based on a position of a parent node being updated.

In some embodiments, determining the position of each slave node may comprise capturing an image of the master node and one or more slave nodes, identifying, in said captured image, the master node and each slave node, calculating a coordinate position for the master node and for each slave node and mapping the position of the master node and each slave node to the physical layout map.

In some embodiments, a target map of module positions may be used in image localization. Each module identified in the image may be associated with a specific target module in the target map. In some embodiments, a marker may be placed on each node and/or link. The marker may be a QR code, fiducial marker or other identifying mark. These marks may be used to identify the specific node or link as well. The marks may also be used to determine position and orientation of said node or link.

In some embodiments, the analysis of the aggregated sensor data may be used to generate a current heatmap corresponding to maximum temperatures. The current heatmap may be compared against an alarm heatmap, wherein the alarm heatmap is based on temperatures indicative of irregular operation of a component. Based on the comparison, a notification or alarm may be generated by the system.

In some embodiments, there may exist only a single path from each slave node to the master node. In some embodiments, one or more of the slave nodes may be connected to the master node through two or more paths. One of the two or more paths may be a primary path and the remaining paths may be redundant paths. Communication may be performed over said primary path. In some embodiments, the master node may be configured to identify a failure of the primary path and switch to using a redundant path.

The appended claims may also serve as a summary of this application.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 4A is a flow chart illustrating an exemplary method that may be performed in accordance with some embodiments.

DETAILED DESCRIPTION

Figure 1:
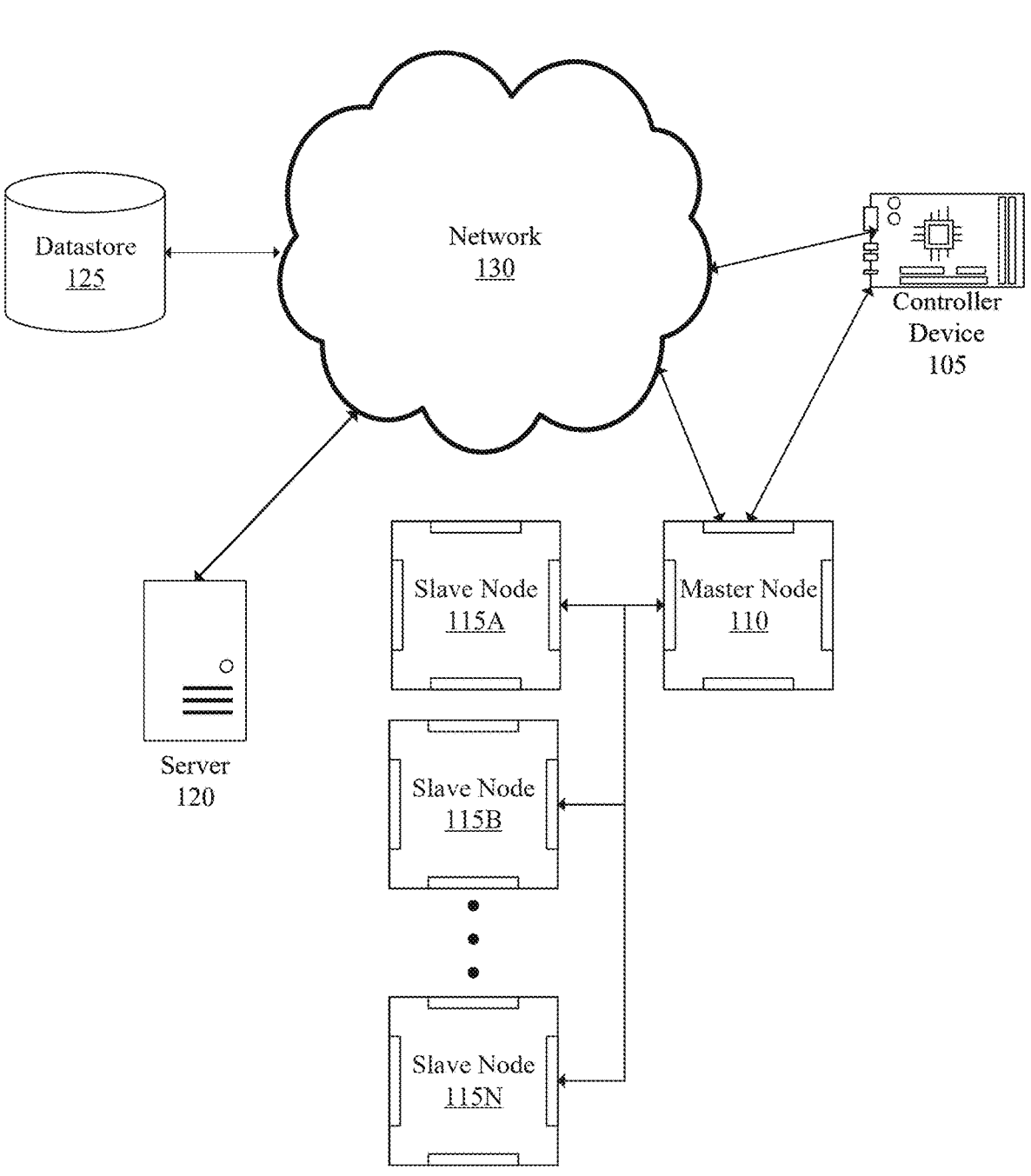
FIG. 1 is a diagram illustrating an exemplary modular thermal monitoring system in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system, device and methods for modular thermal monitoring of electrical and/or mechanical components, cabinets and/or panels. In some embodiments, the system/device may comprise one or more master nodes, one or more slave nodes and/or one or more rigid links connecting the nodes. In some embodiments, each master node may be connected to one or more slave nodes and each slave node may be connected to one or more additional slave nodes. In some embodiments, a group comprising a single master node, one or more slave nodes and one or more rigid links may be assembled into a panel specific layout. In some embodiments, the terms components, cabinets and panels may correspond to electrical panels, subpanels, main lug panels, main distribution boards, sub distribution boards, transfer switch panels, load centers/fuse boxes, three-phase panels, power control center panels, motor control center panels, automatic power factor control panels, lighting panels, fire alarm panels, HVAC panels and/or other electrical panel/cabinets.

In some embodiments, the number and position of each master node, slave node and rigid link may be customizable and based on the specific panel being monitored. In some embodiments, the master node and one or more slave nodes may be attached to the inside of a panel/cabinet door. The nodes and/or rigid links may be attached by adhesives, double sided tape, suction devices, magnets, mechanical fasteners or combination thereof. In some embodiments, magnets may be shielded or isolated from the components of the panel to reduce or eliminate interference with operation of the components and/or monitoring of the panel/components. In some embodiments, other means of attaching the nodes and rigid links may be used.

In some embodiments, the system/device may be embedded within the panel door itself. Imbedding may be performed by modifying the original panel door to include the master/slave nodes and the rigid or flexible links. In some embodiments, the original panel door may be replaced with a custom embedded panel door.

In some embodiments, the nodes and rigid links may draw electrical power from the panel/cabinet itself. Other sources of electrical power may also be used, such as batteries. A combination of power sources may be used to provide electricity to the nodes and rigid links.

In some embodiments, the rigid links may be configured to provide the physical structure of the system. The rigid links may attach to connector ports of a parent and child node, holding the child node in a predetermined position relative to the parent node based on characteristics of the rigid link (length, shape and/or path) and position/orientation of the used connector port of the parent and child nodes.

In some embodiments, the system may be configured to determine a physical layout of all nodes (master and slave) based on the rigid links connecting said nodes. In some embodiments, the position of each node may correspond to a distance between connected nodes and an orientation/angle between said nodes. In some embodiments, the position of each node may correspond to coordinate points in a common reference frame.

In some embodiments, each rigid link may be configured to store information corresponding to physical dimensions of the rigid link. The information may include shape, size, length, width, path of the link or any other information describing the physical position or regions occupied by the rigid link. In some embodiments, the rigid link may also store information such as a unique identification number or other information for identification of the rigid link. In some embodiments, the rigid link may also be configured to store information corresponding to the nodes attached, direction of attachment, branch level of a parent/child tree of nodes or other information associated with the position of the rigid link.

In some embodiments, the system may comprise a combination of rigid and flexible links. In some embodiments, only rigid or only flexible links may be used. In some embodiments, flexible links may be used in place of some or all of the rigid links. In some embodiments, the position of nodes connected by flexible links may be determined through manual or semi-manual process. A technician or user of the system may be prompted, in a user interface, to identify a node and enter a position of the node. The position may be entered as an absolute position relative to the electrical panel/cabinet or the panel door in which the node is installed on. In some embodiments, the position of the node may be specified in relative terms, based on position and orientation of one or more connected nodes.

In some embodiments, the position of each node may be determined by internal measurements instead of external references. In some embodiments, a single reference position (node or link) may be used to determine the physical position of each of the other components of the system. For example, the master node may be installed at a specified position (top left) on the inside of a panel door. The panel door may be used as the reference frame for creating a node/link map corresponding to the positions of all other nodes and rigid links based on this initial position. In some embodiments, the node/link map may be generated in a first frame of reference (master node reference frame) and mapped to a second frame of reference (panel door reference frame).

In some embodiments, the system may be configured to receive position data for one or more nodes from user input. In some embodiments, a user interface may prompt a user to enter coordinates for one or more nodes. In some embodiments, the system may be configured to automatically determine the position of the nodes as described and further determine a confidence score corresponding to said determined node positions. For nodes with a confidence score below a predetermined threshold, the system may prompt the user to manually enter the positional coordinated for the node.

In some embodiments, the system may be configured to recalculate the positions of one or more nodes. In some embodiments, the system may be configured to recalculate and update the positions of some, or all of the downstream children nodes attached to it.

In some embodiments, the system may be configured to automatically determine the position of a node connected by a flexible link. The position determination may be based at least partly on the length of the flexible link, distance from one or more connected nodes and/or distance from one or more unconnected nodes.

In some embodiments, each node may include fiducial markers and/or identification markings, such as QR codes and barcodes. These fiducial markers may be used to identify individual nodes and determine position and orientation of said nodes.

In some embodiments, the system may be configured to identify critical zones based on analysis of an image captured of an electrical panel. In some embodiments, the system may be able to identify components of the electrical panel and generate an alarm heatmap based on the operational parameters of each of the identified components and their position within the panel. In some embodiments, the system may adjust the sampling rate of each sensor based on the identified components.

In some embodiments, rigid and flexible lengths may be of an unknown length. The system may be configured to estimate the length of a length through measuring a resistance between nodes connected by the link. In some embodiments, the length may be calculated based on the time it takes for a signal to be transmitted from one node to another. In some embodiments, components such as resistors may be used to determine the length of the link. In some embodiments, a resistance may be measured across the link and the length calculated based on the measured resistance.

In some embodiments, the system may be configured to generate a heatmap of a covered region, wherein the heatmap corresponds to temperatures measured by the sensors of the one or more nodes. In some embodiments, the system may be configured to generate a heatmap of temperatures of a panel being monitored. The heatmap may correspond to maximum temperatures, average temperatures, minimum temperatures, or changes in temperature. In some embodiments, the heatmap may be compared with an alarm heatmap to determine a fault or failure state. Other determinations may be made based on the comparison. In some embodiments, the heatmap may be in the form of a lookup table with values for the measured and/or interpolated temperatures.

In some embodiments, an image of the installed nodes may be captured, and the position of each node may be extracted from said image.

In some embodiments, a panel coverage map may be generated based at least in part on positioning of each node, position of one or more sensors of each said node, operational parameters of each sensor, and distance from each sensor to the components in the panel/cabinet. In some embodiments, a coverage area for a sensor may be calculated based on a distance from the panel door to a component in the panel. In some embodiments, different components may be at different distances from the panel door, for example when components of different height/sizes are connected to a board or plate on a common plane. In some embodiments, the distance used to determine coverage area may be the distance to the common plane in which the components are connected.

In some embodiments, the coverage area of each sensor may be combined into the panel coverage map. In some embodiments, the positioning of the nodes may be configured to provide a predetermined amount of coverage area overlap between adjacent sensors. The amount of coverage area overlap may be set by a user or calculated based on the sensor capabilities, size of the panel, type of panel, type of components, size of components, operating parameters of panel/components, type of monitoring being performed, analysis requirements and/or other monitoring requirements.

In some embodiments, the node/link map and the panel coverage map may be combined and mapped to a captured image of the panel/components to generate a combined panel map. The combined panel map may be used to generate graphical representations of sensor readings from the nodes, the physical layout of the nodes and components and provide a user interface for displaying information corresponding to the operation of the panel, components, and nodes.

In some embodiments, the graphical representation may be configured to display temperature gradients of the components of the panel.

FIG. 1 is a diagram illustrating an exemplary modular thermal monitoring system 100 in which some embodiments may operate.

The modular thermal monitoring system 100 may comprise one or more controller devices 105, one or more master nodes 110, one or more slave nodes 115A-115N, one or more servers 120, one or more datastores 125 and a network 130.

The controller devices 105 may be one or more physical or virtual machines configured to communicate with the one or more master nodes 110, one or more slave nodes 115A-115N, one or more servers 120 and one or more datastores 125 over network 130. In some embodiments, the controller device 105 may be integrated into the master node 110.

The master nodes 110 may be installed on an inside surface of a panel or cabinet door. In some embodiments, the master nodes 110 may be integrated into the door or attached to the surface of the door. In some embodiments, the master nodes 110 may be configured to control operation of the one or more slave nodes 115A-115N. The master node may manage operation of the sensors of slave nodes connected to as well as the sensors within the master node 110. The master node 110 may manage sensor sampling rate, sampling resolution, data transfer of the sensor data, aggregation of the sensor data, aggregation, and analysis of individual sensor data as well as analysis of the aggregated sensor data.

In some embodiments, each panel or cabinet in a facility may have a master node 110 installed and one or more slave nodes 115 attached to said master node. In some embodiments, each master node 110 may be controlled by a single controller device 105. In some embodiments, the controller device 105 may be incorporated into the one or more master nodes 110, and each of the one or more master nodes 110 may independently manage/control all slave nodes attached to them. Each master node 110 may also independently communicate with server 120 when the controller device is integrated into the master node.

The slave nodes 115A-115N may be connected, directly and/or indirectly, to one another and to the master node 110. The connections between nodes may be rigid links.

The servers 110 may be one or more physical or virtual machines configured to communicate with the one or more master nodes 110, one or more slave nodes 115A-115N and one or more datastores 125. The one or more servers 120 may be configured as a distributed computing infrastructure.

Datastores 125 may communicate with one another over network 130. Datastores 125 may be any storage device capable of storing data for processing or as a result of processing information at the controller devices 105, master nodes 110, slave nodes 115A-115N and/or servers 120. The datastores 125 may be a separate device or the same device as server 120. The datastores 125 may be located in the same location as that of servers 120, or at separate locations.

Network 130 may be an intranet, internet, mesh, LTE, GSM, peer-to-peer or other communication network that allows the one or more master nodes 110, one or more slave nodes 115A-115N, one or more servers 120 and one or more datastores 125 to communicate with one another.

Figure 2A:
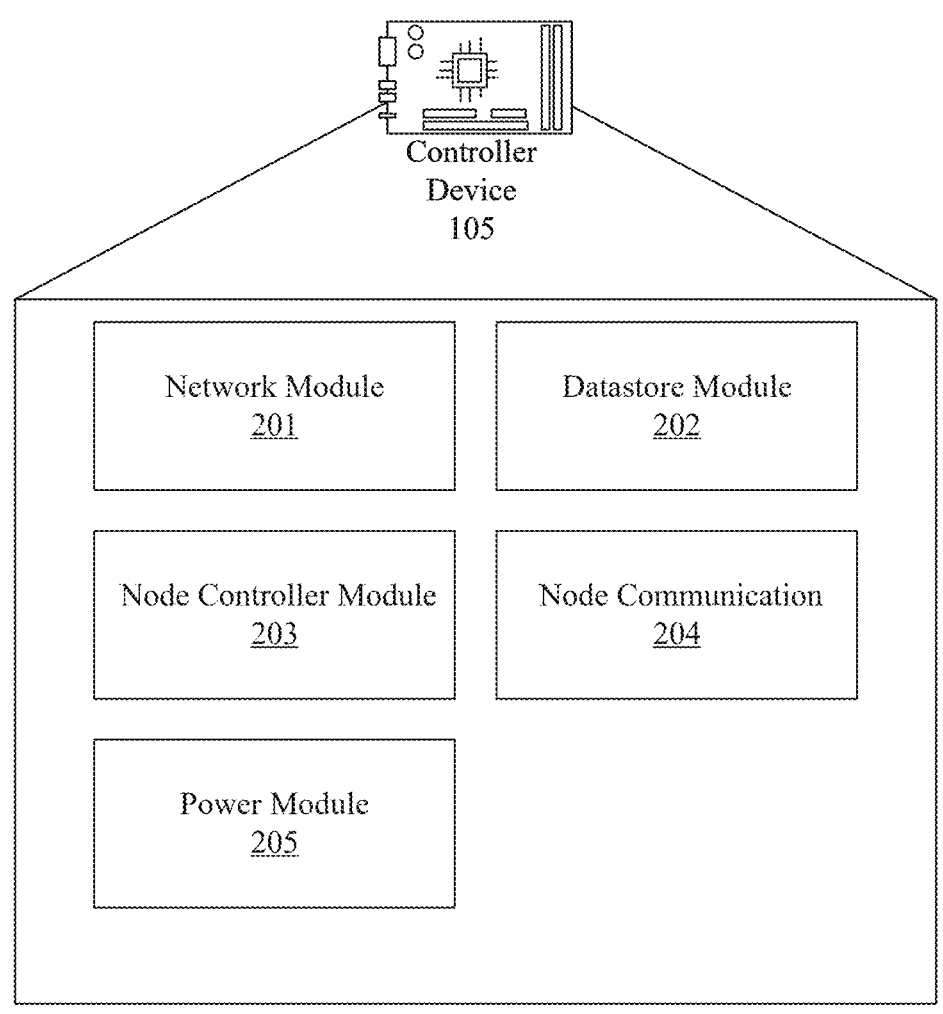
FIG. 2A is a diagram illustrating an exemplary controller device in accordance with aspects of the present disclosure.

FIG. 2A is a diagram illustrating an exemplary controller device 105 in accordance with aspects of the present disclosure. Controller device 105 may comprise a network module 201, a datastore module 202, node controller module 203, node communication module 204 and power module 205.

Network module 201 may transmit and receive data from other computing systems via a network such as network 130 as described above with regard to FIG. 1. In some embodiments, the network module 201 may enable transmitting and receiving data from the Internet. Data received by the network module 201 may be used by the other modules. The modules may transmit data through the network module 201.

The datastore module 202 may be configured to store information generated by the one or more modules operating on the controller device 105. The one or more modules operating on the controller device 105 may also retrieve information from the datastore module 202. Datastore module 202 may also be configured to receive and store information received over network module 201.

Node controller module 203 may be configured to schedule and control the operation of master node 110 and any directly or indirectly attached slave node 115A-115N. In some embodiments, the node controller module 203 may be configured to determine the interval between sensor reading for each node. The sensor modules of the one or more sensors may be configured to capture data synchronously or asynchronously. The sampling rate of the sensors may be adjusted by the node controller module 203. In some embodiments, the sampling rate may be increased based on analysis of the received data. In some embodiments, the sampling rate may be changed based on exceeding a threshold value (temperature reading). The node controller module 203 may also be configured to aggregate data received from each node before being sent to server 120. The received data may be preprocessed before aggregation or after aggregation. In some embodiments, raw data may be aggregated by the node controller module 203 and sent to server 120. In some embodiments, analysis and processing of the data maty be fully or partially carried out by server 120.

Node communication module 204 may be configured to transmit and receive data from one or more nodes (master and slave nodes). In some embodiments, operational instructions may be sent to one or more nodes, either directly or indirectly through intermediate nodes. The node communication module 204 may receive operational information and sensor readings from one or more connected nodes.

Power module 205 may be configured to receive electrical power from a panel or other power source. Received electrical power may be delivered to one or more connected nodes through rigid links. The rigid links may be configured to transmit data as well as power between connected nodes. In some embodiments, power module 205 may include battery storage or other power storage means.

Figure 2B:
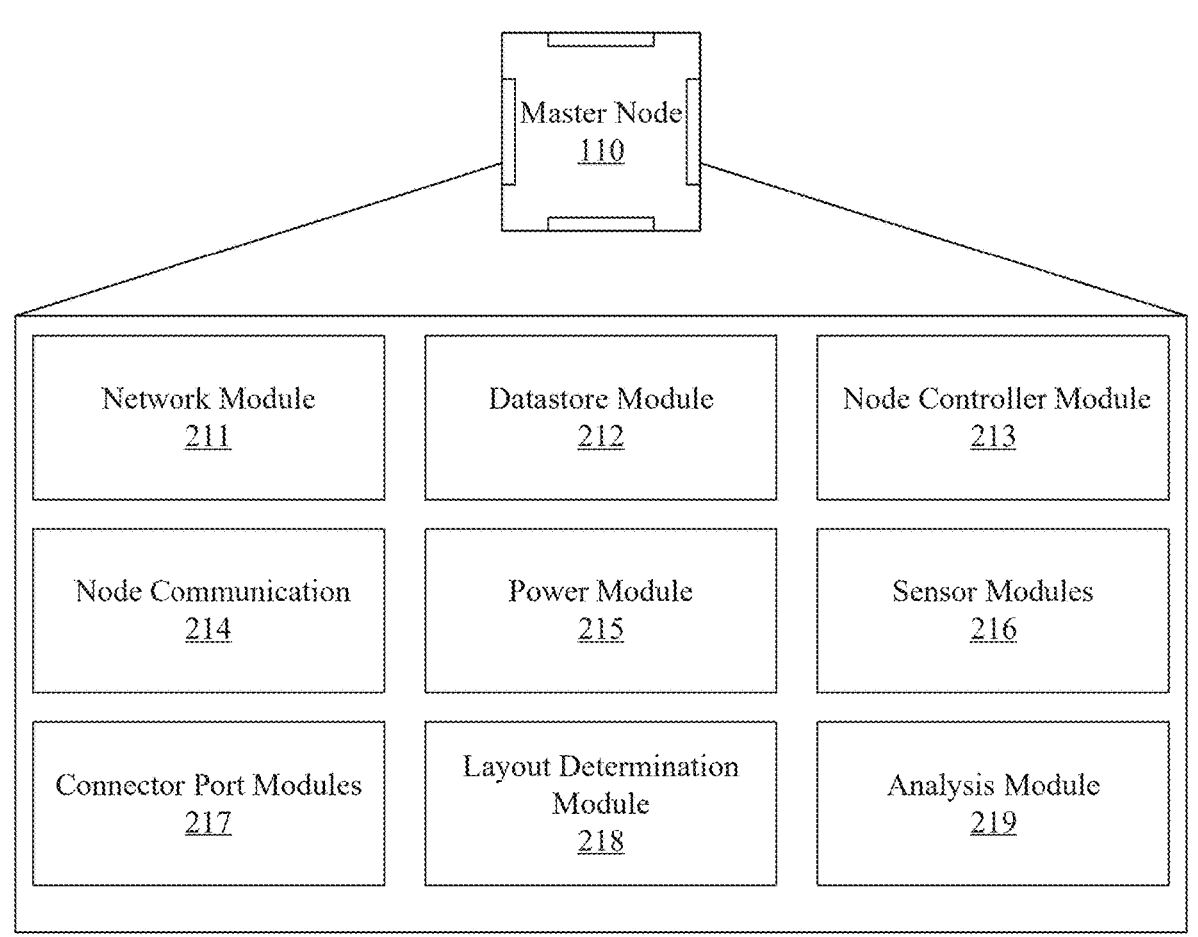
FIG. 2B is a diagram illustrating an exemplary master node in accordance with aspects of the present disclosure.

FIG. 2B is a diagram illustrating an exemplary master node 110 in accordance with aspects of the present disclosure. Master node 110 may comprise a network module 211, a datastore module 212, node controller module 213, node communication module 214, power module 215, sensor modules 216, connector port modules 217, layout determination module 218 and analysis module 219. In some embodiments, the layout determination module 218 and analysis module 219 may be included in the controller device 105 and/or or server 120.

Network module 211 and datastore module 212 may be the same or similar to that of network module 201 and datastore module 202 as described above with regard to FIG. 2A and operate in the same manner and will not be described in detail for the sake of brevity.

In some embodiments, node controller module 213, node communication module 214 and power module 215 may be the same or similar to that of node controller module 203, node communication module 204 and power module 205 of FIG. 2A. Node communication module 213 may be configured to relay information from slave nodes to the controller device 105.

In some embodiments, the functions performed by the controller device 105 may alternatively be performed by the master node 110. In some embodiments, the controller device 105 may integrated or otherwise incorporated into the master node. In some embodiments, some or all processes of the controller device 105 may be performed by the master device.

Sensor modules 216 may comprise one or more thermal imaging cameras or other infrared/thermal sensors. In some embodiments, the sensor modules 216 may comprise a single thermal/infrared pixel. In some embodiments, an array of thermal pixels may be used. In some embodiments, the sensor modules 216 may be mounted perpendicular to the plane of the panel. In some embodiments, the orientation of the sensor modules 216 may be mounted in a non-perpendicular manner. For example, the sensors may be mounted in an oblique angle to produce a modified coverage area. In some embodiments, the sensor modules 216 may comprise one or more non-contact thermal measuring devices.

In some embodiments, the sensor modules 216 may be configured to tilt or scan the sensor over a range of angles. This may reduce the number of sensors needed by increasing the coverage area of a single sensor. In some embodiments, the sensor modules 216 may comprise a raster scanning thermal imaging sensor, such as a MEMS infrared sensor or similar devices.

Connector port modules 217 may be configured to rigidly attach communication channels between nodes. In some embodiments, rigid links may be used between connection port modules 217 of different nodes. In some embodiments, each connector port may correspond to a specific position and orientation with regard to the node. This position/orientation may be used to determine the location/position of each connected node.

Layout determination module 218 may be configured to determine the position of connected nodes and rigid links within a system. The layout determination module 218 may calculate slave node positions based on a reference position of the master node 110, position/orientation of each connector port module of the master node, physical characteristics of each rigid link connected to said connector port module of the master node and position/orientation of the connector port module of a connected slave node. For additional slave nodes attached to a parent slave node, the position determination may be performed in a similar manner to that described above. For example, instead of using the master node as the reference position, a previously determined slave node may be used as reference, and the positions of all slave nodes without a known position can be calculated based on the position/orientation of the connector ports of the reference node, the physical characteristics of the rigid link, and the position/orientation of the connector port on the slave node with an unknown/undetermined position.

Analysis module 219 may be configured to perform one or more monitoring and/or fault detection processes. The analysis may be performed on raw data, preprocessed data, aggregated data and/or individual sensor data from one or more sensors modules at one or more nodes (master and/or slave).

Figure 2C:
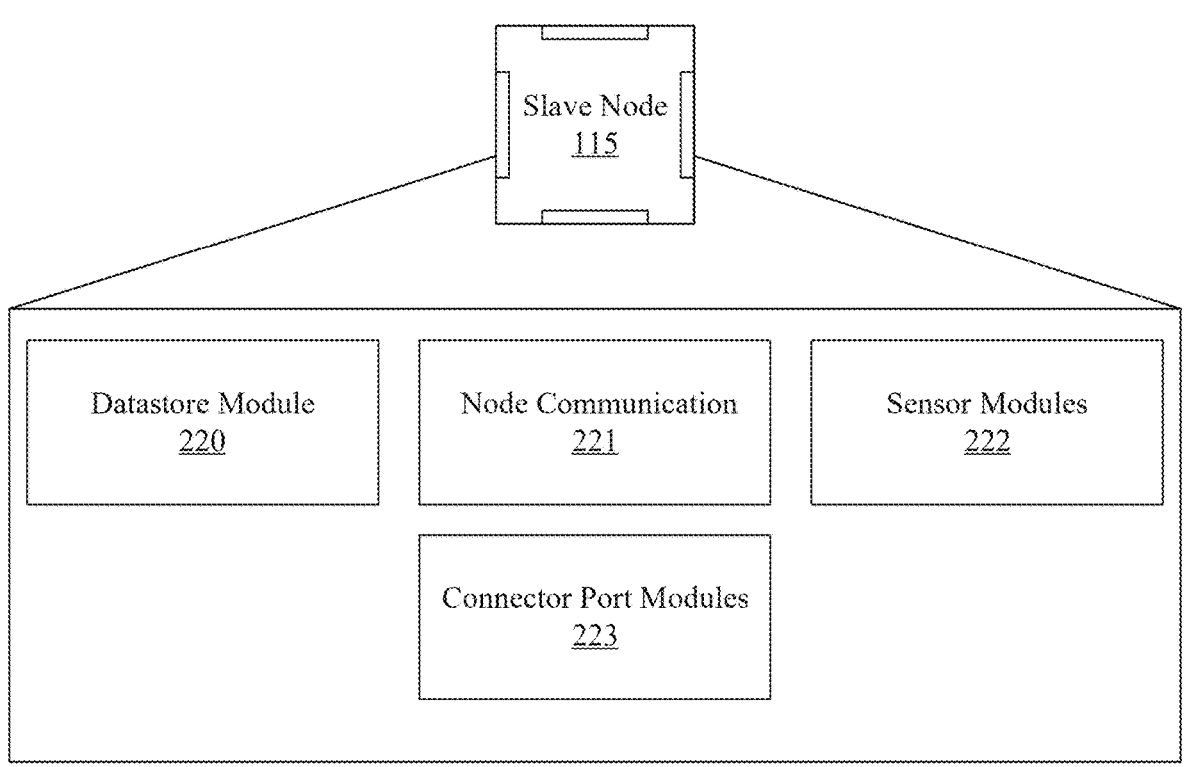
FIG. 2C is a diagram illustrating an exemplary master node in accordance with aspects of the present disclosure.

FIG. 2C is a diagram illustrating an exemplary slave node 115 in accordance with aspects of the present disclosure. Slave node may comprise datastore module 220, node communication module 221, sensor modules 222 and connector port modules 223. Datastore module 220, node communication module 221, sensor modules 222 and connector port modules 223 may be the same or similar to that of datastore module 212, node communication module 213, sensor modules 216 and connector port modules 217 of master node 110 in FIG. 2B. The function of datastore module 220, node communication module 221, sensor modules 222 and connector port modules 223 are the same as described above with regard to the modules of FIGS. 2A and 2B and will not be repeated for the sake of brevity.

Figure 2D:
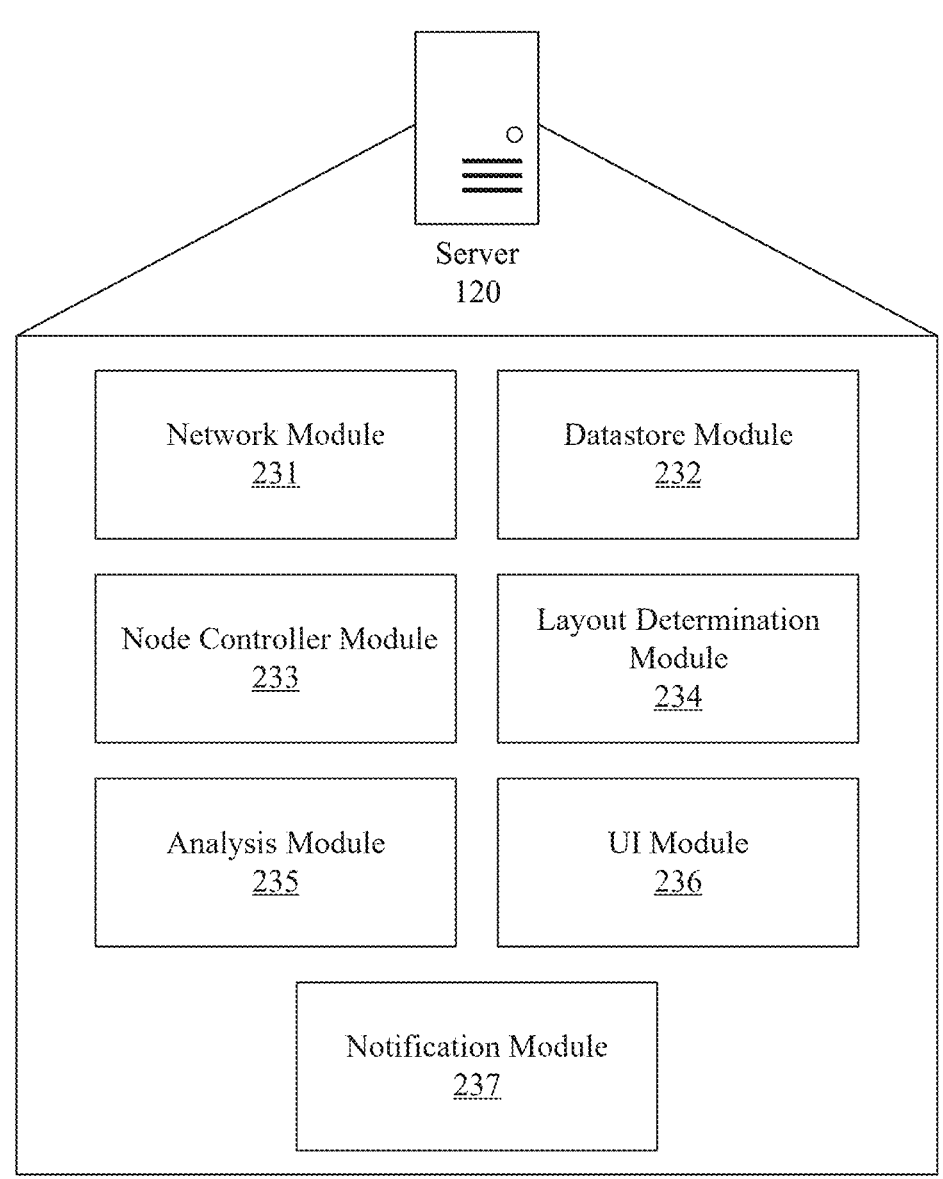
FIG. 2D is a diagram illustrating an exemplary server in accordance with aspects of the present disclosure.

FIG. 2D is a diagram illustrating an exemplary server 120 in accordance with aspects of the present disclosure. Server 120 may comprise network module 231, datastore module 232, node controller module 233, layout determination module 234, analysis module 235, UI module 236 and notification module 237.

Network module 231, datastore module 232, node controller module 233, layout determination module 234 and analysis module 235 may be the same or similar to that of network module 211, datastore module 212, node controller module 213, layout determination module 218 and analysis module 219 a described above with regard to FIG. 2B.

UI module 236 may be configured to generate a user interface for control and interaction between a user and components of the panel, master nodes 110, slave nodes 115 and controller devices 105. The UI generated by the UI module 236 may control other devices and provide graphical representations of information collected from the devices/nodes. In some embodiments, the UI module may be configured to display real-time sensor data, analysis results, or other information related to the operation of a monitored panel.

Notification module 237 may be configured to generate and send notification to internal or external systems, users, technicians, the UI module, master nodes, slave nodes, controller devices, servers, datastores or combination thereof. In some embodiments, changes to the operation of the controller device, master nodes, slave nodes, servers, panels/cabinets, or equipment may be changed or modified as a result of signals or messages generated by or received from the notification module 237. In some embodiments, alerts or other notifications may be sent over SMS, email or other communication protocol.

Figure 3A:
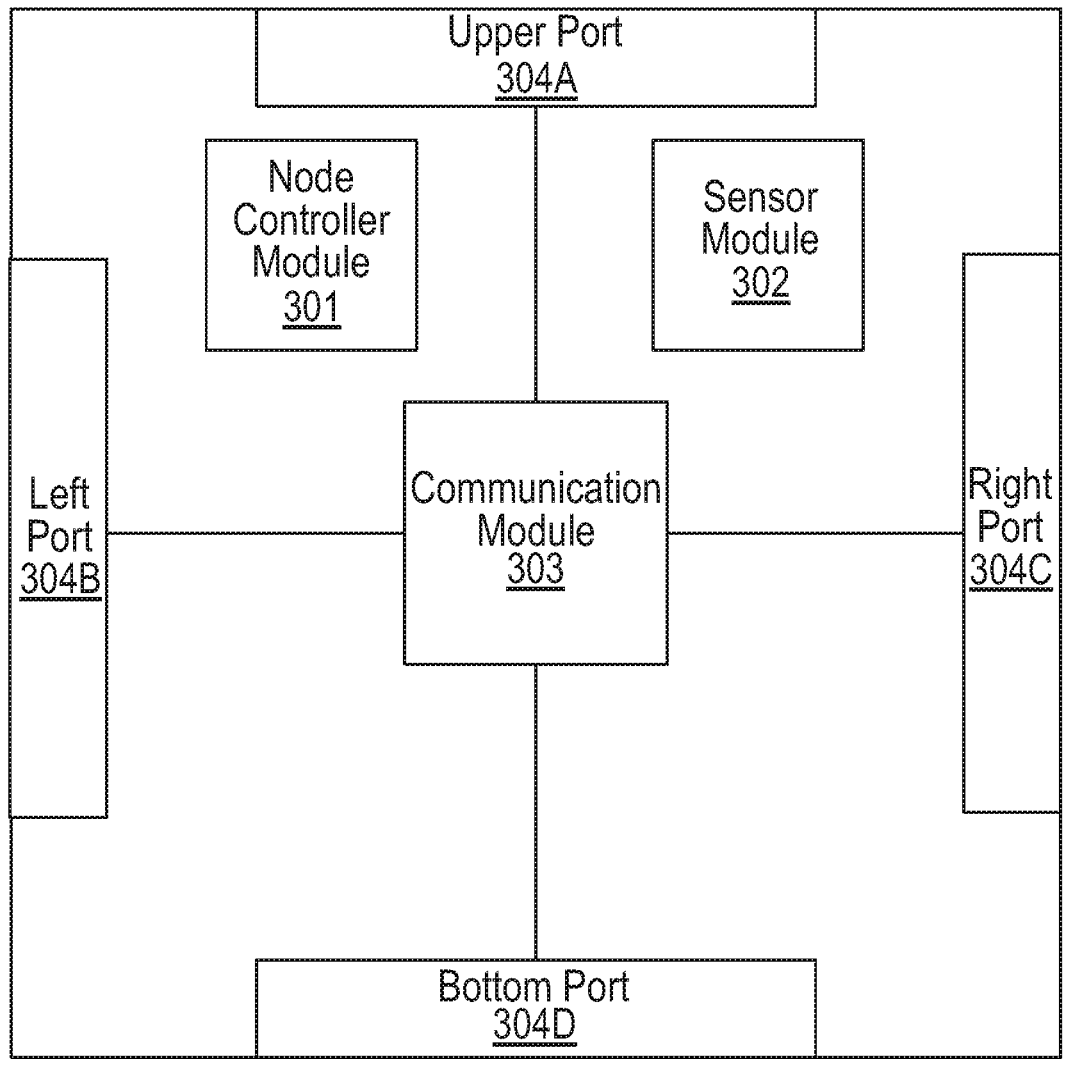
FIG. 3A is a diagram illustrating an exemplary node in accordance with aspects of the present disclosure.

FIG. 3A is a diagram illustrating an exemplary node 300 in accordance with aspects of the present disclosure. In some embodiments, the device may comprise one or more nodes 300. Each of the one or more nodes may include a node controller module 301 and one or more sensor modules 302, wherein the sensor module 302 may be a camera or other sensors. In some embodiments, the sensor module 302 may be an infrared camera. The node controller module 301 may be configured to control capture of sensor data, filtering/preprocessing of the captured sensor data, aggregation of sensor data and transmission of raw/processed/aggregated sensor data. Each node may further comprise a communication module 303, wherein the communication module may be configured to transmit, through a plurality of connector ports 304A-304D, information between nodes. The node controller module 301 may use the communication module 303 to transmit the raw/processed/aggregated sensor data generated by the node. In some embodiments, the communication module 303 may be configured to receive and relay raw/processed/aggregated sensor data from other connected nodes. Other information may also be sent/received by the communication module 303, such as operational data of the node or connected nodes and/or instructions for operation of the node or connected nodes.

Figure 3B:
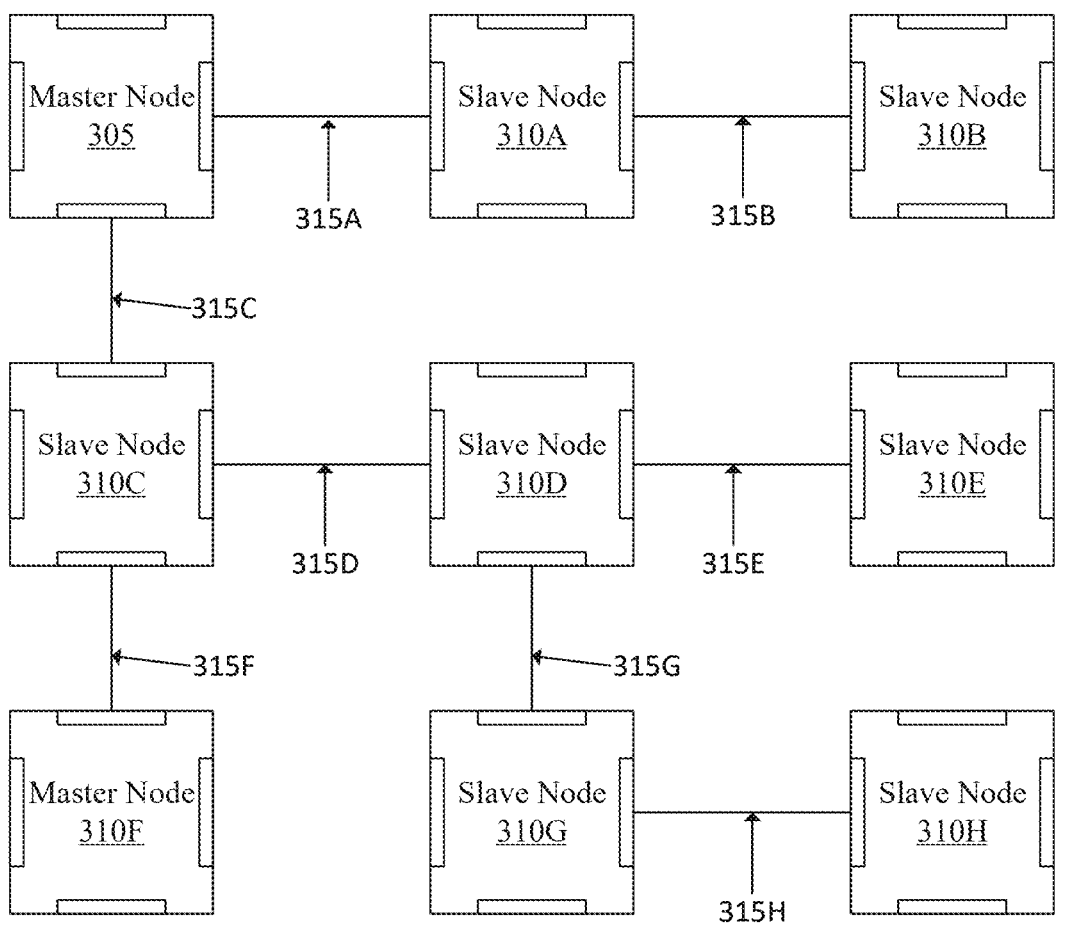
FIG. 3B is a diagram illustrating an exemplary master-slave node layout in accordance with aspects of the present disclosure.
Figure 3C:
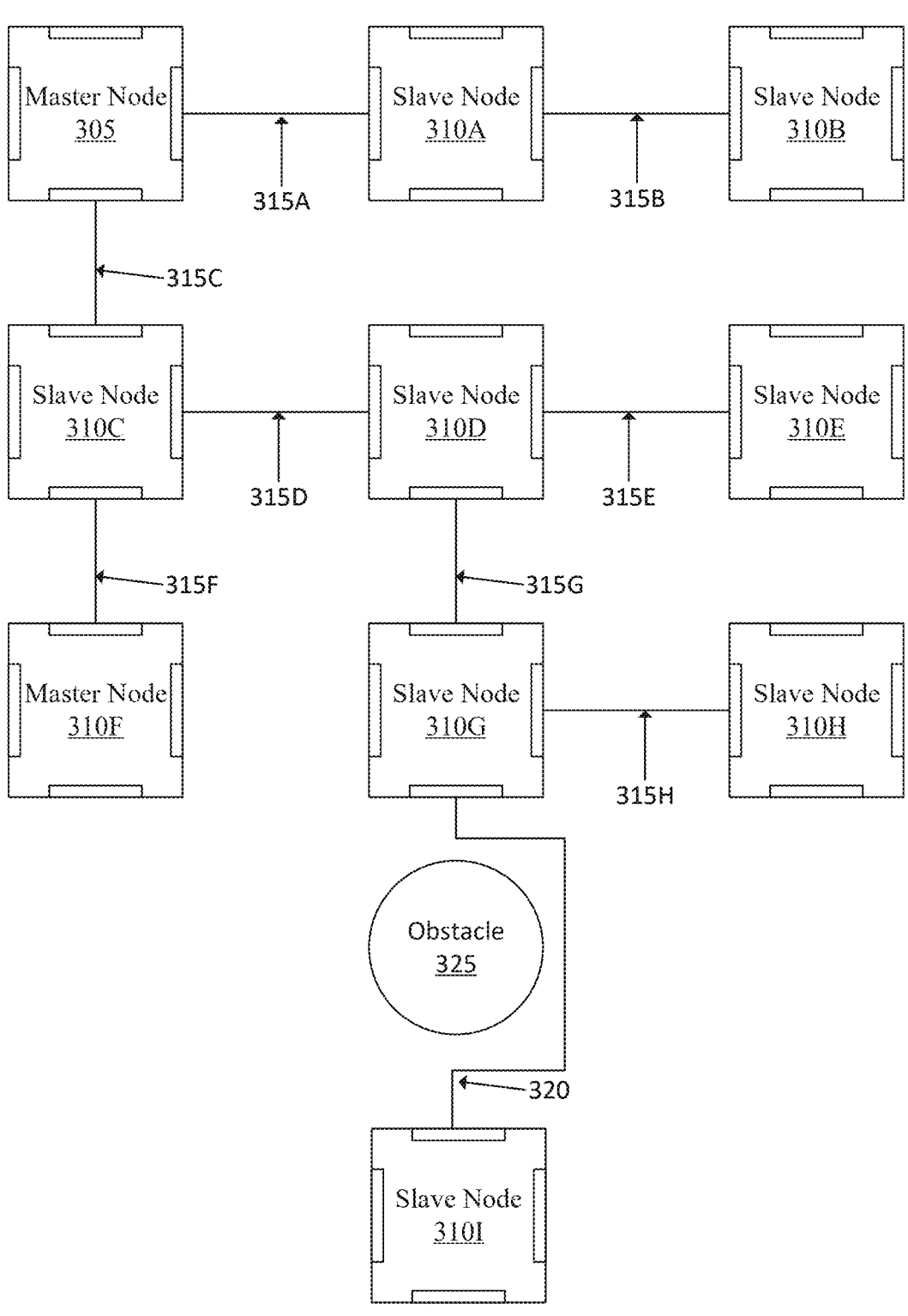
FIG. 3C is a diagram illustrating an exemplary master-slave node layout in accordance with aspects of the present disclosure.

FIGS. 3B and 3C show a physical layout of a plurality of nodes on a panel in accordance with aspects of the present disclosure.

In some embodiments, the nodes may be arranged in a master-slave architecture. Slave nodes 310 may be configured to collect raw sensor data and send the collected data to a master node 305. Master nodes 305 and slave nodes 310 may be connected to one another through rigid links 315. In some embodiments, a parent-child relationship may be used to describe the layout of slave nodes 310. This information may be stored in a hierarchical tree or other data structure. FIG. 3B shows an exemplary layout with a master node 305, a plurality of slave nodes 310A-310H and a plurality of rigid links 315A-315H.

In some embodiments, each rigid link 315A-H may comprise a physical path between two connectors, between which information and/or power may be transmitted. In some embodiments, the rigid links 315 may be straight paths and defined by a length of the physical path (i.e., distance between the two connectors) as shown in FIG. 3B.

FIG. 3C. Shows an example of an indirect rigid link 320 connecting two slave nodes 310G and 310I. The indirect rigid link 320 may be described as a non-direct path between two points. For example, indirect rigid links 320 may include curves, turns or changes in direction of the path to avoid obstacles/obstructions 325. The indirect rigid links 320 may be defined by a distance between connectors and an orientation between said connectors. In some embodiments, the indirect rigid links 320 may include information describing the physical path between connectors.

In some embodiments, the system may be configured to generate a map of node and link positions. In some embodiments, the system may determine the position of each slave node (child node) based on the position of its parent node.

Figure 3D:
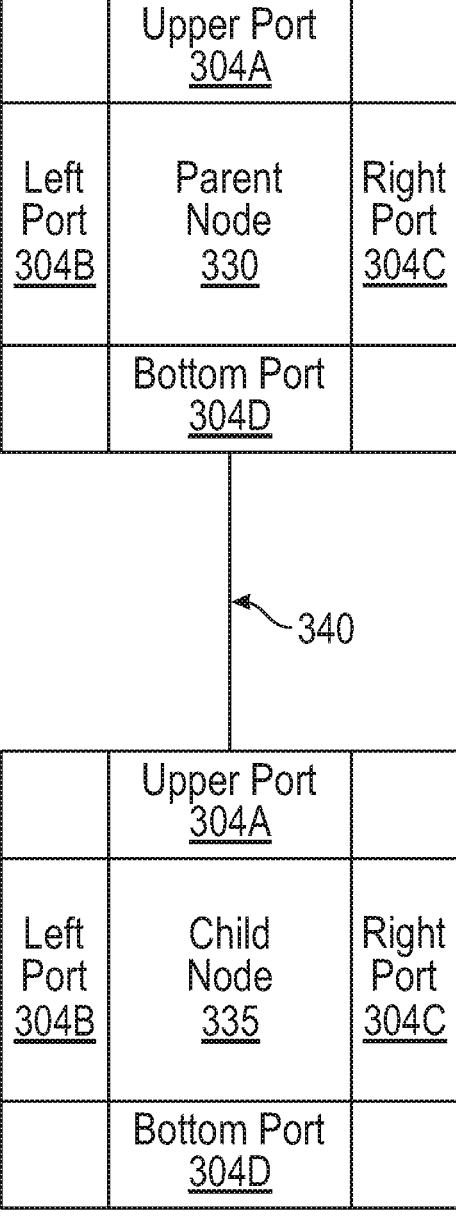
FIG. 3D is a diagram illustrating an exemplary master-slave node layout in accordance with aspects of the present disclosure.
Figure 3E:
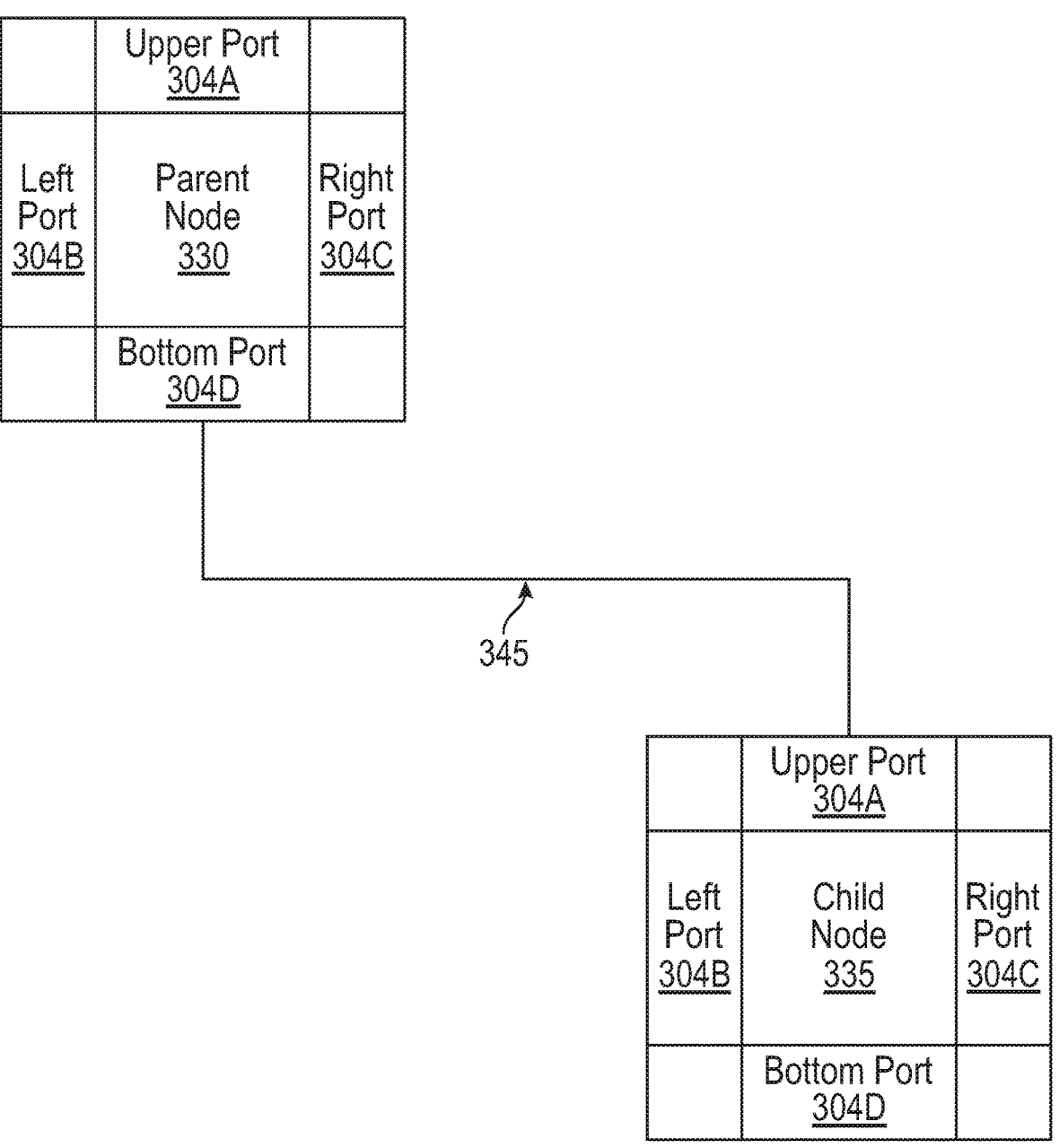
FIG. 3E is a diagram illustrating an exemplary master-slave node layout in accordance with aspects of the present disclosure.

FIGS. 3D and 3E show a parent node 330 connected to a child node 335 through a rigid link 340 (FIG. 3D) or an indirect rigid link 345 (FIG. 3E). In some embodiments, for each child node 335, the system may be configured to identify a rigid link 340 (or indirect rigid link 345) connecting the child node 335 to the parent node 330.

FIG. 3D shows an exemplary rigid link 340 attached to the parent node 330 at a parent connector port 304D (bottom port) and the child node 335 at a child connector port 304A (upper port). Each connector port may have a position and orientation associated with it. The system may calculate the position of the child node 335 using information corresponding to size and orientation of the rigid link 340, the position/orientation of the parent connector port 304D and the position/orientation of the child connector port 304A.

FIG. 3E shows an exemplary indirect rigid link 344 attached to the parent node 330 at a parent connector port 304D (bottom port) and the child node 335 at a child connector port 304A (upper port). The position of the child node 335 of FIG. 3E may be determined in a similar to that described above. In some embodiments, the position of the child node 335 may also be based at least in part on the information describing the physical path of the indirect rigid link 340.

In some embodiments, each rigid link and indirect rigid link may store information corresponding to one or more parameters, wherein the parameters may include an identification number, a size, a length, a shape and/or a path. These parameters may be used in the determination of a child nodes (slave nodes) position.

FIG. 4A is a flow chart illustrating an exemplary method 400 that may be performed in accordance with some embodiments.

At step 401, the system may be configured to attach to an inside surface of a door of an electric panel, a master node and one or more slave nodes.

At step 402, the system may be configured to connect one or more rigid links to the master node and each of the one or more slave nodes, wherein each rigid link comprises a first connector end and a second connector end.

At step 403, the system may be configured to receive, by a controller device, one or more parameters for each rigid link, wherein the one or more parameters comprise length of the rigid link and information corresponding to orientation and position of the connections made by the first connector end and second connector end of the rigid link.

At step 404, the system may be configured to determine a position for each slave node relative to a position of the master node.

At step 405, the system may be configured to generate a physical layout map of the one or more slave nodes and the master node.

At step 406, the system may be configured to map the physical layout map to a panel layout.

At step 407, the system may be configured to receive, from the master node, aggregated sensor data.

At step 408, the system may be configured to map the received aggregated sensor data to the physical layout map.

At step 409, the system may be configured to analyze, by an analysis module, the received aggregated sensor data.

At step 410, the system may be configured to overlay, onto the physical layout map, results of said analysis.

Figure 4B:
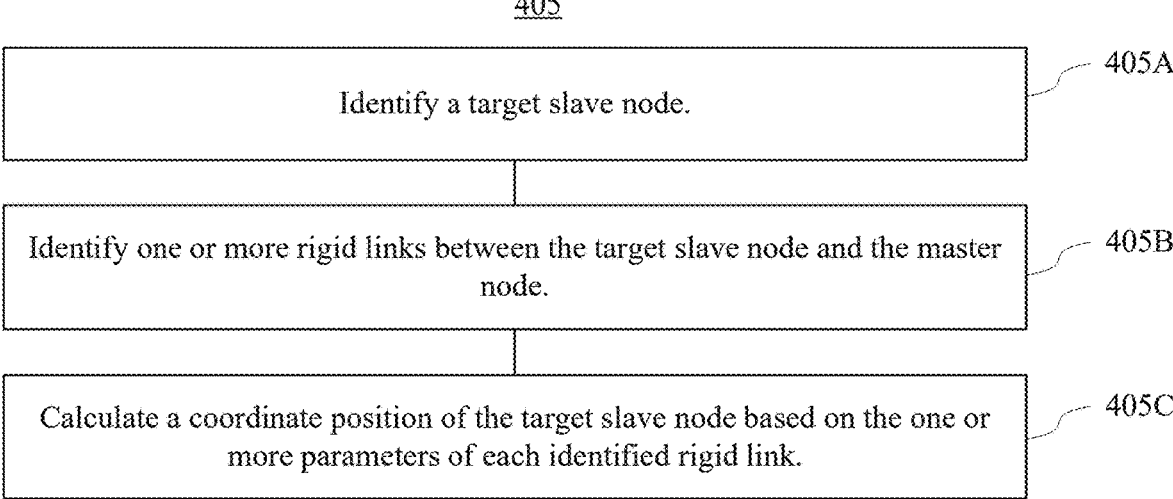
FIG. 4B is a flow chart illustrating an exemplary method that may be performed in accordance with some embodiments.

FIG. 4B is a flow chart illustrating an exemplary method for generating a physical layout map of the nodes 405 that may be performed in accordance with some embodiments.

At step 405A, the system may be configured to identify a target slave node.

At step 405B, the system may be configured to identify one or more rigid links between the target slave node and the master node.

At step 405C, the system may be configured to calculate a coordinate position of the target slave node based on the one or more parameters of each identified rigid link.

Figure 5:
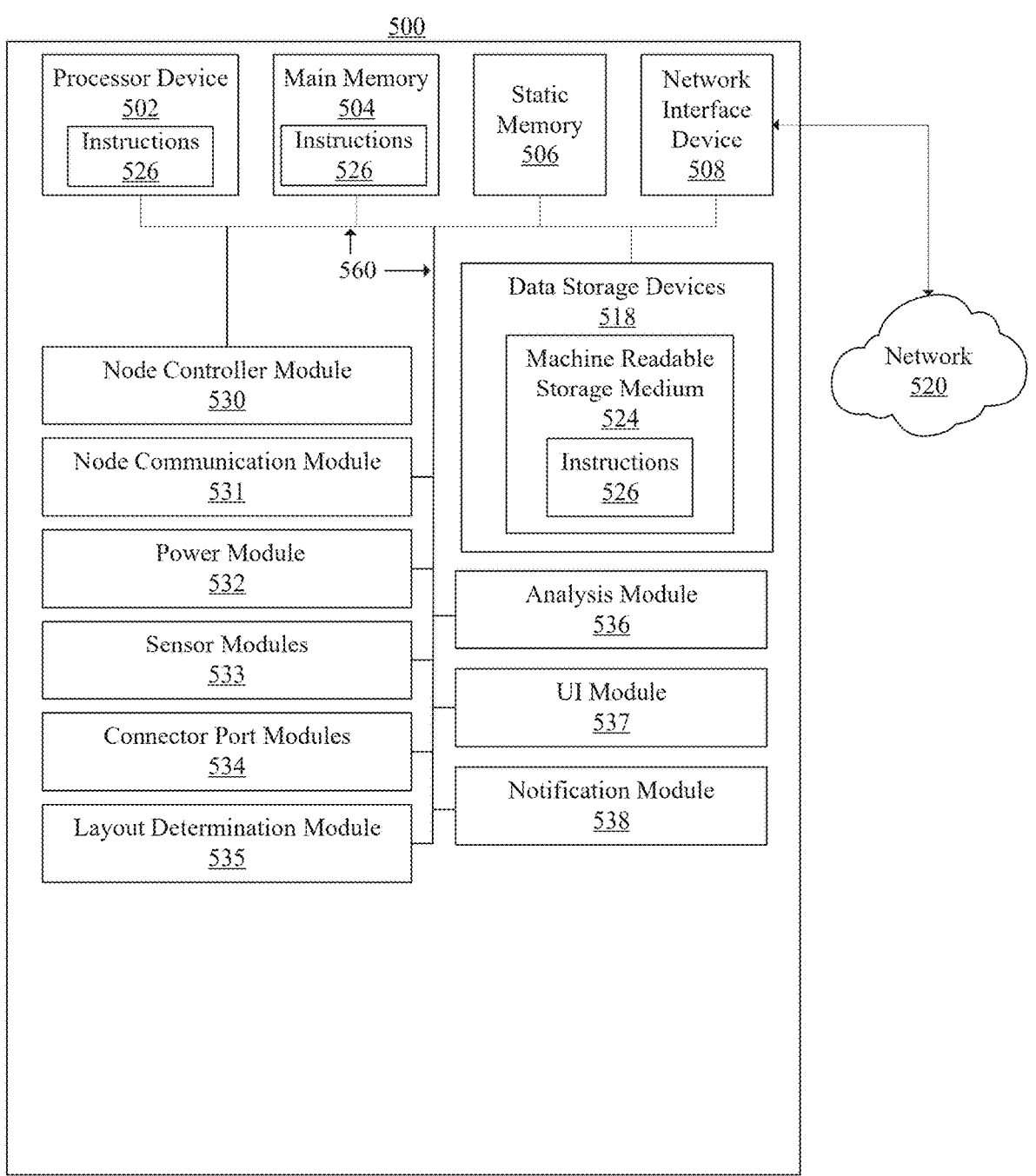
FIG. 5 is a diagram illustrating an exemplary computer/control system that may perform processing in some embodiments and in accordance with aspects of the present disclosure.

FIG. 5 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 560.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520.

The computer system 500 may also include node controller module 530, node communication module 531, power module 532, sensor modules 533, connector port modules 534, layout determination module 535, analysis module 536, UI module 537 and notification module 538.

Node controller module 530, node communication module 531 and power module 532 may be the same or similar to that of node controller module 203, node communication module 204, power module 205 as disclosed in FIG. 2A.

Sensor modules 533, connector port modules 534, layout determination module 535 and analysis module 536 may be the same or similar to that of sensor modules 216, connector port modules 217, layout determination module 218 and analysis module 219 as disclosed in FIG. 2B.

UI module 537 and notification module 538 may be the same or similar to that of UI module 236 and notification module 237 as disclosed in FIG. 2D.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. Information, including data used in the processes and methods of the system and the one or more sets of instructions or software, may also be stored in blockchain, as NFTs or other decentralized technologies.

In one implementation, the instructions 526 include instructions to implement functionality corresponding to the components of a device to perform the disclosure herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1. A system for monitoring an electrical panel, the system comprising: one or more links, wherein each link comprises a first connector end and a second connector end; a master node, wherein the master node comprises: a master node controller module; a master node communication module; a master sensor module, wherein the master sensor module comprises a non-contact temperature sensor configured to capture temperature data; and one or more master connection port modules; and one or more slave nodes, wherein each slave node comprises: a slave node communication module; a slave sensor module, wherein the slave sensor module comprises a non-contact temperature sensor configured to capture temperature data; and one or more slave connection port modules; wherein the master node is configured to connect to a first level group of nodes, wherein the first level group of nodes comprises one or more of the one or more slave nodes; wherein each of the first level group are connected to one or more secondary children nodes, wherein the secondary children nodes comprise one or more slave nodes; wherein a controller device, in communication with a server over a network connection, is configured to: determine a position for each slave node relative to a position of the master node; generate a physical layout map of the one or more slave nodes and the master node; map the physical layout map to a panel layout; receive, from the master node, aggregated temperature data, wherein the aggregated temperature data comprises temperature data from each of the one or more slave nodes and temperature data from the master node; map the received aggregated temperature data to the physical layout map; analyze, by an analysis module, the received aggregated temperature data; and overlay, onto the physical layout map, results of said analysis.

Example 2. The System of Example 1, wherein one or more of the links are rigid links.

Example 3. The System of any one of Examples 1-2, wherein each node of the first level group is connected through a slave connection port module to a master connection port module of the master node by a rigid link, and wherein the first connector end of the rigid link is attached to the master connection port module and the second connector end of the rigid link is attached to the slave connection port module; and wherein each secondary child node is connected through a slave connection port module on the secondary child node to a slave connection port module of the first level group node by a rigid link, and wherein the first connector end of the rigid link is attached to the slave connection port module of the first level group node and the second connector end of the rigid link is attached to the slave connection port module of the secondary child node.

Example 4. The System of any one of Examples 1-3, wherein the controller device is further configured to receive, from the master node, one or more parameters for each rigid link, wherein the one or more parameters comprise length of the rigid link and information corresponding to orientation and position of the connections made by the first connector end and second connector end of the rigid link.

Example 5. The System of any one of Examples 1-4, wherein determining the position of for each slave node comprises: identifying a target slave node; identifying one or more rigid links between the target slave node and the master node; and calculating a coordinate position of the target slave node based on the one or more parameters of each identified rigid link.

Example 6. The System of any one of Examples 1-5, wherein the position of the target slave node is updated based on a position of a parent node being updated.

Example 7. The System of any one of Examples 1-6, wherein determining the position of each slave node comprises: capturing an image of the master node and one or more slave nodes; identifying, in said captured image, the master node and each slave node; calculating a coordinate position for the master node and for each slave node; and mapping the position of the master node and each slave node to the physical layout map.

Example 8. The System of any one of Examples 1-7, wherein the analysis of the aggregated temperature data is used to generate a current heatmap corresponding to maximum temperatures.

Example 9. The System of any one of Examples 1-8, wherein the system is configured to compare the current heatmap against an alarm heatmap, wherein the alarm heatmap is based on temperatures indicative of irregular operation of a component, and generate a notification or alarm based on said comparison.

Example 10. The System of any one of Examples 1-9, wherein there exists only a single path from each slave node to the master node.

Example 11. The System of any one of Examples 1-10, wherein one or more of the slave nodes are connected to the master node through two or more paths.

Example 12. The System of any one of Examples 1-11, wherein one of the two or more paths is a primary path and the remaining paths are redundant paths, and wherein communication is performed over said primary path.

Example 13. The System of any one of Examples 1-12, wherein the master node is configured to identify a failure of the primary path and switch to using a redundant path.

Example 14. A method for thermal monitoring of an electrical panel, wherein the method comprises: installing a modular monitoring device, wherein installing comprises: attaching, to an inside surface of a door of the electric panel, a master node and one or more slave nodes wherein the master node comprises: a master node controller module; a master node communication module; a master sensor module, wherein the master sensor module comprises a non-contact temperature sensor configured to capture temperature data; and one or more master connection port modules; and wherein each slave node comprises: a slave node communication module; a slave sensor module, wherein the slave sensor module comprises a non-contact temperature sensor configured to capture temperature data; and one or more slave connection port modules; and connecting one or more links to the master node and each of the one or more slave nodes, wherein each link comprises a first connector end and a second connector end; and wherein the master node is configured to connect to a first level group of nodes, wherein the first level group of nodes comprises one or more of the one or more slave nodes; wherein each of the first level group are connected to one or more secondary children nodes, wherein the secondary children nodes comprise one or more slave nodes; wherein a controller device, in communication with a server over a network connection, is configured to: determine a position for each slave node relative to a position of the master node; generate a physical layout map of the one or more slave nodes and the master node; map the physical layout map to a panel layout; receive, from the master node, aggregated temperature data, wherein the aggregated temperature data comprises temperature data from each of the one or more slave nodes and temperature data from the master node; map the received aggregated temperature data to the physical layout map; analyze, by an analysis module, the received aggregated temperature data; and overlay, onto the physical layout map, results of said analysis.

Example 15. The Method of Example 14, wherein one or more of the links are rigid links.

Example 16. The Method of any one of Examples 14-15, wherein each node of the first level group is connected through a slave connection port module to a master connection port module of the master node by a rigid link, and wherein the first connector end of the rigid link is attached to the master connection port module and the second connector end of the rigid link is attached to the slave connection port module; and wherein each secondary child node is connected through a slave connection port module on the secondary child node to a slave connection port module of the first level group node by a rigid link, and wherein the first connector end of the rigid link is attached to the slave connection port module of the first level group node and the second connector end of the rigid link is attached to the slave connection port module of the secondary child node.

Example 17. The Method of any one of Examples 14-16, wherein the controller device is further configured to receive, from the master node, one or more parameters for each rigid link, wherein the one or more parameters comprise length of the rigid link and information corresponding to orientation and position of the connections made by the first connector end and second connector end of the rigid link.

Example 18. The Method of any one of Examples 14-17, wherein determining the position of for each slave node comprises: identifying a target slave node; identifying one or more rigid links between the target slave node and the master node; and calculating a coordinate position of the target slave node based on the one or more parameters of each identified rigid link.

Example 19. The Method of any one of Examples 14-18, wherein determining the position of each slave node comprises: capturing an image of the master node and one or more slave nodes; identifying, in said captured image, the master node and each slave node; calculating a coordinate position for the master node and for each slave node; and mapping the position of the master node and each slave node to the physical layout map.

Example 20. The Method of any one of Examples 1-19, wherein the analysis of the aggregated temperature data is used to generate a current heatmap corresponding to maximum temperatures and wherein the system is configured to compare the current heatmap against an alarm heatmap, wherein the alarm heatmap is based on temperatures indicative of irregular operation of a component, and generate a notification or alarm based on said comparison.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system for monitoring an electrical panel, the system comprising:

one or more links, wherein each link comprises a first connector end and a second connector end;

a master node, wherein the master node comprises:

a non-contact temperature sensor configured to capture temperature data; and one or more master connection ports; and one or more slave nodes, wherein each slave node comprises:

a non-contact temperature sensor configured to capture temperature data; and one or more slave connection ports;

wherein the master node is configured to connect to and communicate with a first level group of nodes, wherein the first level group of nodes comprises one or more of the one or more slave nodes;

wherein each of the first level group are connected to one or more secondary children nodes, wherein the secondary children nodes comprise one or more slave nodes;

wherein a controller device, in communication with a server over a network connection, is configured to:

determine a position for each slave node relative to a position of the master node;

generate a physical layout map of the one or more slave nodes and the master node;

receive, from the master node, aggregated temperature data, wherein the aggregated temperature data comprises temperature data from each of the one or more slave nodes and temperature data from the master node;

map the received aggregated temperature data to the physical layout map;

analyze the received aggregated temperature data; and overlay, onto the physical layout map, results of said analysis.

2. The system of claim 1, wherein one or more of the links are rigid links.

3. The system of claim 2, wherein each node of the first level group is connected through a slave connection port to a master connection port of the master node by a rigid link, and wherein the first connector end of the rigid link is attached to the master connection port and the second connector end of the rigid link is attached to the slave connection port;

and wherein each secondary child node is connected through a slave connection port on the secondary child node to a slave connection port of the first level group node by a rigid link, and wherein the first connector end of the rigid link is attached to the slave connection port of the first level group node and the second connector end of the rigid link is attached to the slave connection port of the secondary child node.

4. The system of claim 3, wherein the controller device is further configured to receive, from the master node, one or more parameters for each rigid link, wherein the one or more parameters comprise length of the rigid link and information corresponding to orientation and position of the connections made by the first connector end and second connector end of the rigid link.

5. The system of claim 4, wherein determining the position of for each slave node comprises:

identifying a target slave node;

identifying one or more rigid links between the target slave node and the master node; and calculating a coordinate position of the target slave node based on the one or more parameters of each identified rigid link.

6. The system of claim 5, wherein the position of the target slave node is updated based on a position of a parent node being updated.

7. The system of claim 1, wherein determining the position of each slave node comprises:

capturing an image of the master node and one or more slave nodes;

identifying, in said captured image, the master node and each slave node;

calculating a coordinate position for the master node and for each slave node; and mapping the position of the master node and each slave node to the physical layout map.

8. The system of claim 1, wherein the analysis of the aggregated temperature data is used to generate a current heatmap corresponding to maximum temperatures.

9. The system of claim 8, wherein the system is configured to compare the current heatmap against an alarm heatmap, wherein the alarm heatmap is based on temperatures indicative of irregular operation of a component, and generate a notification or alarm based on said comparison.

10. The system of claim 5, wherein there exists only a single path from each slave node to the master node.

11. The system of claim 5, wherein one or more of the slave nodes are connected to the master node through two or more paths.

12. The system of claim 11, wherein one of the two or more paths is a primary path and the remaining paths are redundant paths, and wherein communication is performed over said primary path.

13. The system of claim 12, wherein the master node is configured to identify a failure of the primary path and switch to using a redundant path.

14. A method for thermal monitoring of an electrical panel, wherein the method comprises:

installing a modular monitoring device, wherein installing comprises:

attaching, to an inside surface of a door of the electric panel, a master node and one or more slave nodes wherein the master node comprises:

a non-contact temperature sensor configured to capture temperature data; and one or more master connection ports; and wherein each slave node comprises:

a non-contact temperature sensor configured to capture temperature data; and one or more slave connection ports; and connecting one or more links to the master node and each of the one or more slave nodes, wherein each link comprises a first connector end and a second connector end; and wherein the master node is configured to connect to and communicate with a first level group of nodes, wherein the first level group of nodes comprises one or more of the one or more slave nodes;

wherein each of the first level group are connected to one or more secondary children nodes, wherein the secondary children nodes comprise one or more slave nodes;

wherein a controller device, in communication with a server over a network connection, is configured to:

determine a position for each slave node relative to a position of the master node;

generate a physical layout map of the one or more slave nodes and the master node;

receive, from the master node, aggregated temperature data, wherein the aggregated temperature data comprises temperature data from each of the one or more slave nodes and temperature data from the master node;

map the received aggregated temperature data to the physical layout map;

analyze the received aggregated temperature data; and overlay, onto the physical layout map, results of said analysis.

15. The method of claim 14, wherein one or more of the links are rigid links.

16. The method of claim 15, wherein each node of the first level group is connected through a slave connection port to a master connection port of the master node by a rigid link, and wherein the first connector end of the rigid link is attached to the master connection port and the second connector end of the rigid link is attached to the slave connection port;

and wherein each secondary child node is connected through a slave connection port on the secondary child node to a slave connection port of the first level group node by a rigid link, and wherein the first connector end of the rigid link is attached to the slave connection port of the first level group node and the second connector end of the rigid link is attached to the slave connection port of the secondary child node.

17. The method of claim 16, wherein the controller device is further configured to receive, from the master node, one or more parameters for each rigid link, wherein the one or more parameters comprise length of the rigid link and information corresponding to orientation and position of the connections made by the first connector end and second connector end of the rigid link.

18. The method of claim 17, wherein determining the position of each slave node comprises:

identifying a target slave node;

identifying one or more rigid links between the target slave node and the master node; and calculating a coordinate position of the target slave node based on the one or more parameters of each identified rigid link.

19. The method of claim 14, wherein determining the position of each slave node comprises:

capturing an image of the master node and one or more slave nodes;

identifying, in said captured image, the master node and each slave node;

calculating a coordinate position for the master node and for each slave node; and mapping the position of the master node and each slave node to the physical layout map.

20. The method of claim 19, wherein the analysis of the aggregated temperature data is used to generate a current heatmap corresponding to maximum temperatures and wherein the system is configured to compare the current heatmap against an alarm heatmap, wherein the alarm heatmap is based on temperatures indicative of irregular operation of a component, and generate a notification or alarm based on said comparison.

* * * * *